(12) United States Patent
Goto et al.

(10) Patent No.: US 11,180,828 B2
(45) Date of Patent: Nov. 23, 2021

(54) ALUMINUM POROUS BODY AND METHOD FOR PRODUCING ALUMINUM POROUS BODY

(71) Applicant: SUMITOMO ELECTRIC INDUSTRIES, LTD., Osaka (JP)

(72) Inventors: Kengo Goto, Osaka (JP); Akihisa Hosoe, Osaka (JP); Hideaki Sakaida, Osaka (JP)

(73) Assignee: SUMITOMO ELECTRIC INDUSTRIES, LTD., Osaka-shl (JP)

(*) Notice: Subject to any disclaimer, the term of this patent is extended or adjusted under 35 U.S.C. 154(b) by 52 days.

(21) Appl. No.: 16/500,208

(22) PCT Filed: Dec. 21, 2017

(86) PCT No.: PCT/JP2017/045854
§ 371 (c)(1),
(2) Date: Oct. 2, 2019

(87) PCT Pub. No.: WO2018/185983
PCT Pub. Date: Oct. 11, 2018

(65) Prior Publication Data
US 2020/0109463 A1    Apr. 9, 2020

(30) Foreign Application Priority Data

Apr. 5, 2017   (JP) .............................. JP2017-075270

(51) Int. Cl.
*C22C 1/08*   (2006.01)
*C25D 1/00*   (2006.01)

(52) U.S. Cl.
CPC ................ *C22C 1/08* (2013.01); *C25D 1/003* (2013.01)

(58) Field of Classification Search
CPC ................................... C22C 1/08; C22C 1/003
See application file for complete search history.

(56) References Cited

U.S. PATENT DOCUMENTS

| | | |
|---|---|---|
| 2003/0200837 A1 | 10/2003 | Matsuura et al. |
| 2012/0328957 A1 | 12/2012 | Hosoe et al. |
| 2015/0037689 A1 | 2/2015 | Nishimura et al. |
| 2017/0121835 A1* | 5/2017 | Goto et al. ............... C25D 1/08 |

FOREIGN PATENT DOCUMENTS

| | | |
|---|---|---|
| CN | 1464804 A | 12/2003 |
| CN | 106460216 A | 2/2017 |
| JP | 2014-235815 A | 12/2014 |
| JP | 2016-838 A | 1/2016 |
| WO | WO-2012/111609 A1 | 8/2012 |
| WO | WO-2013/140940 A1 | 9/2013 |
| WO | WO-2015/198626 A1 | 12/2015 |

* cited by examiner

*Primary Examiner* — Amanda C. Walke
(74) *Attorney, Agent, or Firm* — Faegre Drinker Biddle & Reath LLP

(57) ABSTRACT

An aluminum porous body has a skeleton with a three-dimensional network structure, in which the skeleton is formed of an aluminum layer containing aluminum carbide, and when the aluminum porous body is subjected to XRD measurement, diffraction peaks originating from aluminum carbide are detected at two peak positions in a 2θ range of 30.8° or more and 31.5° or less and a 2θ range of 31.6° or more and 32.3° or less.

9 Claims, 3 Drawing Sheets

ALUMINUM POROUS BODY AND METHOD FOR PRODUCING ALUMINUM POROUS BODY

TECHNICAL FIELD

The present disclosure relates to an aluminum porous body and a method for producing an aluminum porous body.

The present application claims priority to Japanese Patent Application No. 2017-075270 filed on Apr. 5, 2017, the entire contents of which are incorporated herein by reference.

BACKGROUND ART

Patent Literature 1 discloses that a polycrystalline aluminum film formed by plating has improved hardness because of the presence of aluminum carbide particles in boundaries of aluminum grains.

CITATION LIST

Patent Literature

PTL 1: Japanese Unexamined Patent Application Publication No. 2016-000838

SUMMARY OF INVENTION

An aluminum porous body of the present disclosure is an aluminum porous body having a skeleton with a three-dimensional network structure, in which the skeleton is formed of an aluminum layer containing aluminum carbide, and when the aluminum porous body is measured by an X-ray diffraction method, diffraction peaks originating from aluminum carbide are detected at two peak positions in a 2θ range of 30.8° or more and 31.5° or less and a 2θ range of 31.6° or more and 32.3° or less.

A method for producing an aluminum porous body according to the present disclosure is a method for producing the foregoing aluminum porous body of the present disclosure and includes a conductivity-imparting treatment step of subjecting the surface of the skeleton of a resinous formed body to conductivity-imparting treatment to impart conductivity, the skeleton having a three-dimensional network structure, an electrolytic treatment step of subjecting the resinous formed body after the conductivity-imparting treatment step to electrolytic treatment in an electrolyte solution to provide a resin structure through electrodeposition of aluminum on the surface of the skeleton, a resin removal step of removing the resinous formed body to provide an aluminum porous body through removal of the resin structure by heat-treating the resin structure or by dissolving the resin structure with an acid or an alkali, and a crystallization step, in which the electrolyte solution used in the electrolytic treatment step contains, as components, (A) an aluminum halide, (B) one or more compounds selected from the group consisting of alkylimidazolium halides, alkylpyridinium halides, and urea compounds, and (C) an additive containing a carbon atom, the additive being to be incorporated into aluminum electrodeposited on the surface of the skeleton of the resinous formed body, in which a molar mixing ratio of the component (A) to the component (B) is in the range of 1:1 to 3:1, the resin removal step is performed by dissolution and removal, and the crystallization step is performed by heat-treating the resin structure in an atmosphere at 650° C. or higher and 680° C. or lower in a vacuum of $1.0 \times 10^{-2}$ Pa or less.

A method for producing an aluminum porous body according to the present disclosure is a method for producing the foregoing aluminum porous body of the present disclosure and includes a conductivity-imparting treatment step of subjecting the surface of the skeleton of a resinous formed body to conductivity-imparting treatment to impart conductivity, the skeleton having a three-dimensional network structure, an electrolytic treatment step of subjecting the resinous formed body after the conductivity-imparting treatment step to electrolytic treatment in an electrolyte solution to provide a resin structure through electrodeposition of aluminum on the surface of the skeleton, a resin removal step of removing the resinous formed body to provide an aluminum porous body through removal of the resin structure by heat-treating the resin structure or by dissolving the resin structure with an acid or an alkali, and a crystallization step, in which the electrolyte solution used in the electrolytic treatment step contains, as components, (A) an aluminum halide, (B) one or more compounds selected from the group consisting of alkylimidazolium halides, alkylpyridinium halides, and urea compounds, and (C) an additive containing a carbon atom, the additive being to be incorporated into aluminum electrodeposited on the surface of the skeleton of the resinous formed body, in which a molar mixing ratio of the component (A) to the component (B) is in the range of 1:1 to 3:1, the resin removal step is performed by heat-treating the resin structure at 400° C. or higher in an air atmosphere, and the crystallization step is performed by heat-treating the resin structure in an atmosphere at 650° C. or higher and 680° C. or lower in a vacuum of $1.0 \times 10^{-2}$ Pa or less.

DESCRIPTION OF EMBODIMENTS

Figure 1:
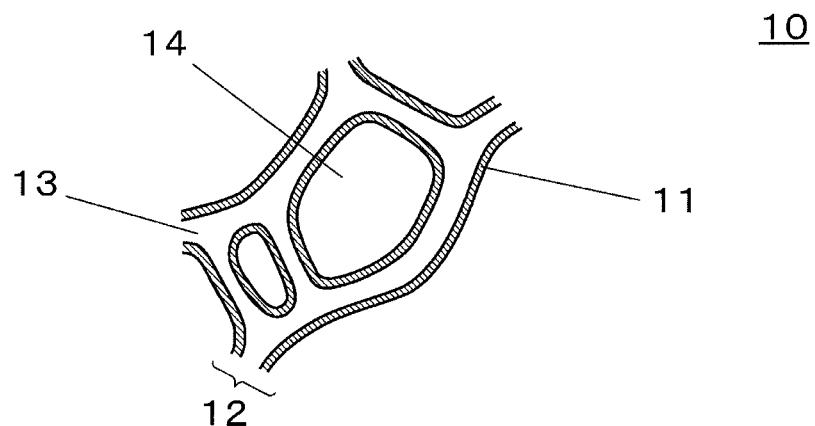
FIG. 1 is an enlarged fragmentary sectional view schematically illustrating an example of an aluminum porous body according to an embodiment of the present disclosure.

Problem to be Solved by Present Disclosure

The skeleton of a metal porous body having a skeleton with a three-dimensional network structure is formed of the aluminum layer described in Patent Literature 1, thereby improving the hardness of the skeleton of the metal porous body. However, there is a limit. To further improve an aluminum porous body having a skeleton with a three-dimensional network structure, the inventors have conducted intensive studies by comparing the physical properties between an aluminum porous body free from aluminum carbide in its skeleton and an aluminum porous body containing aluminum carbide in its skeleton (a porous body having a skeleton formed of the aluminum layer described in Patent Literature 1).

It has been found that the aluminum porous body containing aluminum carbide in its skeleton is improved in tensile strength owing to an improvement in the hardness of the skeleton but is decreased in elongation at break.

The present disclosure aims to provide an aluminum porous body having high elongation at break and high hardness of its skeleton and a production method therefor.

Advantageous Effects of Present Disclosure

According to the present disclosure, it is possible to provide the aluminum porous body having high elongation at break and the skeleton with high hardness and the production method therefor.

Description of Embodiments of Present Disclosure

First, embodiments of the present disclosure will be listed and explained.
(1) An aluminum porous body according to an embodiment of the present disclosure has a skeleton with a three-dimensional network structure, in which the skeleton is formed of an aluminum layer containing aluminum carbide, and when the aluminum porous body is measured by an X-ray diffraction method, diffraction peaks originating from aluminum carbide are detected at two peak positions in a 2θ range of 30.8° or more and 31.5° or less and a 2θ range of 31.6° or more and 32.3° or less.

According to the embodiment of the disclosure described in (1) above, it is possible to provide the aluminum porous body having high elongation at break and the skeleton with high hardness.
(2) In the aluminum porous body described in (1), the skeleton preferably has an aluminum carbide content of 0.5% or more by mass and 1.8% or less by mass.

According to the embodiment of the disclosure described in (2) above, it is possible to provide the aluminum porous body having the skeleton with higher hardness.
(3) The aluminum porous body described in (1) or (2) preferably has a tensile strength of 0.8 MPa or more.

According to the embodiment of the disclosure described in (3) above, it is possible to provide the aluminum porous body having high tensile strength.
(4) The aluminum porous body described in any one of (1) to (3) above preferably has an elongation at break of 1.6% or more.

According to the embodiment of the disclosure described in (4) above, it is possible to provide the aluminum porous body having high elongation at break.
(5) In the aluminum porous body described in any one of (1) to (4) above, the skeleton preferably has a hardness H of 0.5 GPa or more and 2.0 GPa or less, the hardness being measured with a nanoindenter.

According to the embodiment of the disclosure described in (5) above, it is possible to provide the aluminum porous body having the skeleton with high hardness.
(6) In the aluminum porous body described in any one of (1) to (5) above, grains of the aluminum layer constituting the skeleton preferably have a number-average grain size of 2.0 μm or more and 10.0 μm or less.

According to the embodiment of the disclosure described in (6) above, it is possible to provide the aluminum porous body having higher elongation at break.
(7) A method for producing an aluminum porous body according to the present disclosure is a method for producing the foregoing aluminum porous body of the present disclosure and includes a conductivity-imparting treatment step of subjecting the surface of the skeleton of a resinous formed body to conductivity-imparting treatment to impart conductivity, the skeleton having a three-dimensional network structure, an electrolytic treatment step of subjecting the resinous formed body after the conductivity-imparting treatment step to electrolytic treatment in an electrolyte solution to provide a resin structure through electrodeposition of aluminum on the surface of the skeleton, a resin removal step of removing the resinous formed body to provide an aluminum porous body through removal of the resin structure by heat-treating the resin structure or by dissolving the resin structure with an acid or an alkali, and a crystallization step, in which the electrolyte solution used in the electrolytic treatment step contains, as components, (A) an aluminum halide, (B) one or more compounds selected from the group consisting of alkylimidazolium halides, alkylpyridinium halides, and urea compounds, and (C) an additive containing a carbon atom, the additive being to be incorporated into aluminum electrodeposited on the surface of the skeleton of the resinous formed body, in which a molar mixing ratio of the component (A) to the component (B) is in the range of 1:1 to 3:1, and each of the resin-removing step and the crystallization step is performed by heat-treating the resin structure in an atmosphere at 650° C. or higher and 680° C. or lower in a vacuum of $1.0 \times 10^{-2}$ Pa or less.
(8) A method for producing an aluminum porous body according to the present disclosure is a method for producing the foregoing aluminum porous body of the present disclosure and includes a conductivity-imparting treatment step of subjecting the surface of the skeleton of a resinous formed body to conductivity-imparting treatment to impart conductivity, the skeleton having a three-dimensional network structure, an electrolytic treatment step of subjecting the resinous formed body after the conductivity-imparting treatment step to electrolytic treatment in an electrolyte solution to provide a resin structure through electrodeposition of aluminum on the surface of the skeleton, a resin removal step of removing the resinous formed body to provide an aluminum porous body by removing the resin structure by heat-treating the resin structure or by dissolving the resin structure with an acid or an alkali; and a crystallization step, in which the electrolyte solution used in the electrolytic treatment step contains, as components, (A) an aluminum halide, (B) one or more compounds selected from the group consisting of alkylimidazolium halides, alkylpyridinium halides, and urea compounds, and (C) an additive containing a carbon atom, the additive being to be incorporated into aluminum electrodeposited on the surface of the skeleton of the resinous formed body, in which a molar mixing ratio of the component (A) to the component (B) is in the range of 1:1 to 3:1, the resin removal step is performed by dissolution and removal, and the crystallization step is performed by heat-treating the resin structure in an atmosphere at 650° C. or higher and 680° C. or lower in a vacuum of $1.0 \times 10^{-2}$ Pa or less.

(9) A method for producing an aluminum porous body according to the present disclosure is a method for producing the foregoing aluminum porous body of the present disclosure and includes a conductivity-imparting treatment step of subjecting the surface of the skeleton of a resinous formed body to conductivity-imparting treatment to impart conductivity, the skeleton having a three-dimensional network structure, an electrolytic treatment step of subjecting the resinous formed body after the conductivity-imparting treatment step to electrolytic treatment in an electrolyte solution to provide a resin structure through electrodeposition of aluminum on the surface of the skeleton, a resin removal step of removing the resinous formed body to provide an aluminum porous body through removal of the resin structure by heat-treating the resin structure or by dissolving the resin structure with an acid or an alkali, and a crystallization step, the electrolyte solution used in the electrolytic treatment step contains, as components, (A) an aluminum halide, (B) one or more compounds selected from the group consisting of alkylimidazolium halides, alkylpyridinium halides, and urea compounds, and (C) an additive containing a carbon atom, the additive being to be incorporated into aluminum electrodeposited on the surface of the skeleton of the resinous formed body, in which a molar mixing ratio of the component (A) to the component (B) is in the range of 1:1 to 3:1, the resin removal step is performed by heat-treating the resin structure at 400° C. or higher in an air atmosphere, and the crystallization step is performed by heat-treating the resin structure in an atmosphere at 650° C. or higher and 680° C. or lower in a vacuum of $1.0 \times 10^{-2}$ Pa or less.

According to the embodiment of the disclosure described in any one of (7) to (9), it is possible to provide the method for producing the aluminum porous body having high elongation at break and the skeleton with high hardness.

Details of Embodiments of Present Disclosure

Specific examples of an aluminum porous body and a production method therefor according to embodiments of the present disclosure will be described below. The present disclosure is not limited to these examples but is defined by the following claims, and is intended to include any modifications within the scope and meaning equivalent to the scope of the claims.

<Aluminum Porous Body>

An aluminum porous body according to an embodiment of the present disclosure has a skeleton with a three-dimensional network structure.

FIG. 1 is an enlarged schematic view in which the cross-section of an example of an aluminum porous body according to an embodiment of the present disclosure is enlarged. As illustrated in FIG. 1, in an aluminum porous body 10, a skeleton 12 is formed of an aluminum layer 11 containing aluminum carbide. The interior 13 of the skeleton 12 is hollow. The aluminum porous body 10 has a communicating pore. A porous portion 14 is defined by the skeleton 12. The aluminum layer 11 contains high-crystallinity aluminum carbide; thus, the aluminum porous body 10 has high elongation at break and the skeleton with high hardness.

As described above, in the aluminum porous body according to the embodiment of the present disclosure, the aluminum layer constituting the skeleton contains high-crystallinity aluminum carbide. Thus, when the aluminum porous body according to the embodiment of the present disclosure is measured by an X-ray diffraction (XRD) method, diffraction peaks originating from aluminum carbide are detected at two peak positions in a 2θ range of 30.8° or more and 31.5° or less and a 2θ range of 31.6° or more and 32.3° or less. When an aluminum porous body containing conventional aluminum carbide is measured by XRD, only a single diffraction peak originating from the aluminum carbide is detected because the aluminum carbide has poor crystallinity and is amorphous. In contrast, in the aluminum porous body according to the embodiment of the present disclosure, the two diffraction peaks are detected in the ranges above because the aluminum carbide contained in the aluminum layer constituting the skeleton has very high crystallinity. Additionally, because of the high-crystallinity aluminum carbide, the aluminum porous body according to the embodiment of the present disclosure has higher elongation at break than the conventional aluminum porous body.

The XRD measurement may be performed using CuKα radiation under excitation conditions of 45 kV and 40 mA.

In the aluminum porous body according to the embodiment of the present disclosure, the skeleton preferably has an aluminum carbide content of 0.5% or more by mass and 1.8% or less by mass. At an aluminum carbide content of 0.5% or more by mass, the skeleton has high hardness, thus leading to the aluminum porous body having high strength (tensile strength). At an aluminum carbide content of 1.8% or less by mass, a decrease in elongation at break can be inhibited. From these points of view, the skeleton of the aluminum porous body more preferably has an aluminum carbide content of 0.8% or more by mass and 1.2% or less by mass, even more preferably 0.9% or more by mass and 1.1% or less by mass.

The aluminum carbide content of the skeleton of the aluminum porous body can be calculated from the ratio of a diffraction peak originating from aluminum to a diffraction peak originating from aluminum carbide detected when the aluminum porous body is measured by an X-ray diffraction method. In the case where the skeleton of an aluminum porous body contains a component other than aluminum or aluminum carbide and where a diffraction peak originating from the component is detected, the aluminum carbide content may be calculated from the ratio of a diffraction peak originating from the component to the diffraction peak originating from aluminum to the diffraction peak originating from aluminum carbide.

The aluminum porous body preferably has a tensile strength of 0.8 MPa or more. The tensile strength of the aluminum porous body refers to a value obtained by applying tensile stress to the aluminum porous body (test piece) and dividing the maximum stress applied to a test piece at the time of fracture of the test piece by the initial cross-sectional area of the test piece. Note that because the test piece is formed of the aluminum porous body, the cross-sectional area is defined as an apparent cross-sectional area. The test piece may have a shape measuring 20 mm in width, 100 mm in length, and 60 mm in gauge length when both ends are fixed by grips (length excluding tabs for gripping).

The aluminum porous body has a tensile strength of 0.8 MPa or more and thus has high strength. An increase in the coating weight of the aluminum porous body tends to increase the tensile strength of the aluminum porous body. In the aluminum porous body according to the embodiment of the present disclosure, for example, when the coating weight of the aluminum porous body is 135 g/m$^2$ or more, the aluminum porous body can have a tensile strength of 0.8 MPa or more.

The coating weight of the aluminum porous body refers to the mass of the aluminum porous body per apparent unit area.

Higher tensile strength of the aluminum porous body is preferred. The aluminum porous body more preferably has a tensile strength of 1.0 MPa or more, even more preferably 1.2 MPa or more.

The aluminum porous body preferably has an elongation at break of 1.6% or more. The elongation at break of the aluminum porous body refers to, in the case of measuring the tensile strength of the aluminum porous body, the proportion (percentage) of the length of the test piece (length between the grips) at the time of application of the maximum stress to the gauge length of the aluminum porous body (test piece) before application of tensile stress.

In the case of the aluminum porous body having an elongation at break of 1.6% or more, a crack or the like is not easily formed in the aluminum porous body when the aluminum porous body is deformed. An increase in the coating weight of the aluminum porous body tends to increase the elongation at break of the aluminum porous body. In the aluminum porous body according to the embodiment of the present disclosure, for example, when the coating weight of the aluminum porous body is 135 g/m$^2$ or more, the aluminum porous body can have an elongation at break of 1.6% or more.

Higher elongation at break of the aluminum porous body is preferred. The aluminum porous body more preferably has an elongation at break of 1.8% or more, even more preferably 2.0% or more.

The skeleton of the aluminum porous body preferably has a hardness H of 0.5 GPa or more and 2.0 GPa or less, the hardness being measured with a nanoindenter.

When the skeleton of the aluminum porous body has a hardness H of 0.5 GPa or more, the aluminum porous body has the skeleton with high hardness. When the skeleton of the aluminum porous body has a hardness H of 2.0 GPa or less, the aluminum porous body has high elongation at break. From these points of view, the skeleton of the aluminum porous body more preferably has a hardness H of 0.8 GPa or more and 1.5 GPa or less, even more preferably 0.9 GPa or more and 1.2 GPa or less.

In the aluminum porous body according to the embodiment of the present disclosure, grains of the aluminum layer constituting the skeleton preferably have a number-average grain size of 2.0 μm or more and 10.0 μm or less. The number-average grain size of the grains of the aluminum layer refers to the average grain size of freely-selected 10 grains observed when a cross section of the skeleton of the aluminum porous body is observed with an electron microscope (SEM). When the number of grains observed in one field of view is less than 10, observation may be continued in a different field of view to measure the grain size of a total of 10 grains. The grain size of a grain refers to the average of the longest diameter and the shortest diameter of the grain observed with SEM.

When the grains of the aluminum layer have a number-average grain size of 2.0 μm or more, the aluminum porous body has high elongation at break. When the grains of the aluminum layer have a number-average grain size of 10.0 μm or less, high hardness is provided. From these points of view, the grains of the aluminum layer constituting the skeleton of the aluminum porous body more preferably have a number-average grain size of 4.0 μm or more and 8.0 μm or less, even more preferably 5.0 μm or more and 7.5 μm or less.

The porosity, the average pore diameter, and the thickness of the aluminum porous body may be appropriately selected in accordance with the application of the aluminum porous body. For example, in the case where the aluminum porous body is used as an electrode (collector) of a battery, a thin aluminum porous body with a small average pore diameter is preferred. In the case of the aluminum porous body is used for heat dissipation, a thick aluminum porous body with a large average pore diameter is preferred.

The porosity of the aluminum porous body refers to the percentage of the volume of the internal space (porous portion) of the aluminum porous body with respect to the apparent volume.

The average pore diameter of the aluminum porous body refers to the reciprocal of the number of cells (cells/inch) defined by the skeleton of the aluminum porous body.

<Method for Producing Aluminum Porous Body>

A method for producing an aluminum porous body according to an embodiment of the present disclosure is a method for producing the aluminum porous body according to the embodiment of the present disclosure.

[Method for Producing Aluminum Porous Body According to First Embodiment]

A method for producing an aluminum porous body according to a first embodiment includes a conductivity-imparting treatment step, an electrolytic treatment step, a resin removal step, and a crystallization step. These steps will be described in detail below.

—Conductivity-Imparting Treatment Step—

Figure 2:
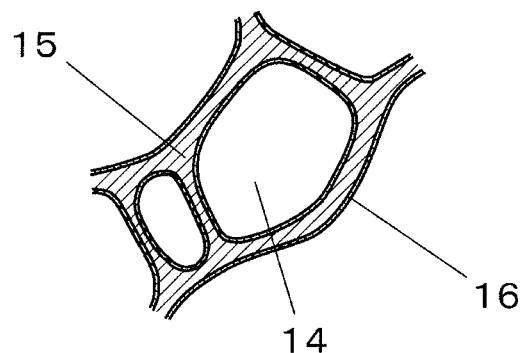
FIG. 2 is an enlarged fragmentary sectional view schematically illustrating an example of a state in which a conductive layer is disposed on the surface of the skeleton of a resinous formed body.

The conductivity-imparting treatment step is a step of providing a resinous formed body having a skeleton with a three-dimensional network structure and subjecting the surface of the skeleton to conductivity-imparting treatment to impart conductivity. For example, conductivity can be imparted to the surface of the skeleton of the resinous formed body by forming a conductive layer so as to cover the surface of the skeleton of the resinous formed body. FIG. 2 is an enlarged fragmentary sectional view schematically illustrating an example of a state in which a conductive layer 16 is disposed on the surface of the skeleton of a resinous formed body 15.

(Resinous Formed Body)

When an aluminum porous body according to the embodiment of the present disclosure is produced, a resinous formed body having a skeleton with a three-dimensional network structure (hereinafter, also referred to simply as "resinous formed body") is used as a base. As illustrated in FIG. 2, the resinous formed body 15 has a communicating pore, and the porous portion 14 is defined by the skeleton. As the resinous formed body 15, for example, a resin foam, a nonwoven fabric, felt, or a woven fabric may be used. These may be used in combination, as needed. The material of the resinous formed body 15 may be any material that can be removed by heat treatment after the surface of the skeleton is plated with aluminum. In particular, in the case of the resinous formed body 15 having a sheet-like shape, a flexible material is preferred in terms of handling because if the rigidity is too high, the skeleton will break.

Figure 3:
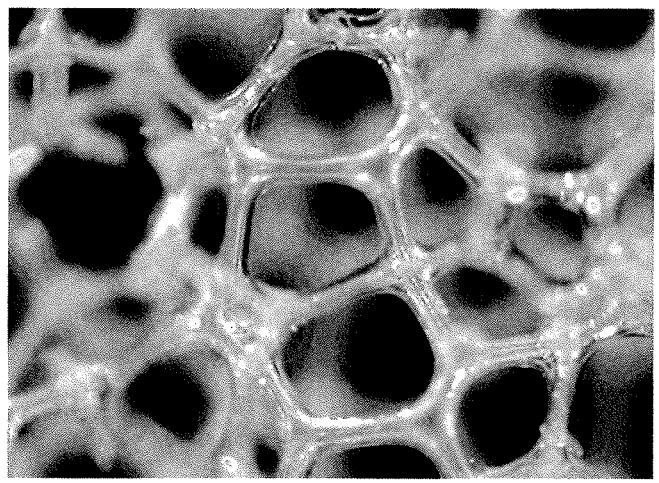
FIG. 3 is a photograph of a urethane foam as an example of a resinous formed body having a skeleton with a three-dimensional network structure.

As the resinous formed body 15 having the skeleton with the three-dimensional network structure, a resin foam is preferably used. The resin foam may be any porous resin foam. A known or commercially available porous resin foam may be used. For example, a urethane foam or a styrene foam may be used. Among these, in particular, the urethane foam is preferred in view of high porosity. FIG. 3 is a photograph of a foamed urethane resin.

Because aluminum is electro-deposited on the surface of the skeleton of the resinous formed body 15 to form the skeleton of the aluminum porous body, the porosity, the average pore diameter, and the thickness of the aluminum porous body are substantially equal to the porosity, the average pore diameter, and the thickness of the resinous formed body 15. Thus, the porosity, the average pore diameter, and the thickness of the resinous formed body 15 may be appropriately selected in accordance with the porosity, the average pore diameter, and the thickness of the target aluminum porous body. The porosity and the average pore diameter of the resinous formed body 15 are defined the same as the porosity and the average pore diameter of the aluminum porous body.

(Conductivity-Imparting Treatment)

A method for subjecting the surface of the skeleton of the resinous formed body 15 to conductivity-imparting treatment is not particularly limited as long as it is a method by which the conductive layer 16 can be formed on the surface of the skeleton of the resinous formed body 15. Examples of the material constituting the conductive layer 16 include metals such as nickel, titanium, and stainless steel and carbon powders such as amorphous carbon, e.g., carbon black, and graphite. Among these, in particular, carbon powders are preferred. Carbon black is more preferred. In the case where the conductive layer 16 is formed using an amorphous carbon or a carbon powder other than metal, the conductive layer 16 is also removed in the resin removal step described below.

Regarding specific examples of the conductivity-imparting treatment, for example, in the case of using nickel, electroless plating treatment and sputtering treatment are preferably exemplified. In the case of using a metal such as titanium or stainless steel or a material such as carbon black or graphite, an example of a preferred method is treatment of applying a mixture, obtained by adding a binder to the fine powder of the material, to the surface of the skeleton of the resinous formed body 15.

As the electroless plating treatment using nickel, for example, the resinous formed body 15 may be immersed in a known electroless nickel-plating bath such as an aqueous solution of nickel sulfate containing sodium hypophosphite serving as a reductant. The resinous formed body 15 may be immersed in an activation liquid containing a very small amount of palladium ions (cleaning liquid, available from Japan Kanigen Co., Ltd.) before immersion in the plating bath, as needed.

The sputtering treatment using nickel may be performed as follows: For example, after the resinous formed body 15 is attached to a substrate holder, a direct-current voltage is applied between the holder and a target (nickel) while introducing an inert gas. The inert gas is ionized and collides with nickel to eject nickel particles. The ejected nickel particles are deposited on the surface of the skeleton of the resinous formed body 15.

The conductive layer 16 may be continuously formed so as to cover the surface of the skeleton of the resinous formed body 15. The coating weight of the conductive layer 16 is preferably, but not necessarily, 1.0 g/m$^2$ or more and 30 g/m$^2$ or less, more preferably 5.0 g/m$^2$ or more and 20 g/m$^2$ or less, even more preferably 7.0 g/m$^2$ or more and 15 g/m$^2$ or less.

The coating weight of the conductive layer refers to the mass of the conductive layer per apparent unit area of the resinous formed body including the conductive layer formed on the surface of the skeleton thereof.

—Electrolytic Treatment Step—

Figure 4:
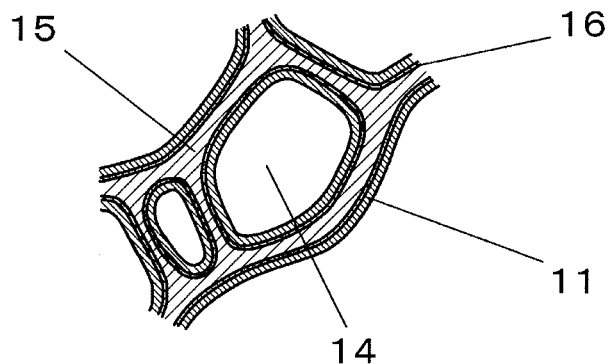
FIG. 4 is an enlarged fragmentary sectional view schematically illustrating an example of a state in which an aluminum layer is disposed on the surface of a conductive layer disposed on the surface of the skeleton of a resinous formed body.

The electrolytic treatment step is a step of subjecting the resinous formed body to which conductivity has been imparted to electrolytic treatment in an electrolyte solution to provide a resin structure through electrodeposition of aluminum on the surface of the skeleton. FIG. 4 is an enlarged fragmentary sectional view schematically illustrating an example of a state in which the aluminum layer 11 is disposed on the surface of the conductive layer 16 disposed on the surface of the skeleton of the resinous formed body 15.

(Electrolyte Solution)

As the electrolyte solution, a mixture of a molten salt and component (C) serving as an additive is used, the molten salt containing component (A) and component (B).

Component (A): an aluminum halide

Component (B): one or more compounds selected from the group consisting of alkylimidazolium halides, alkylpyridinium halides, and urea compounds Component (C): an additive containing a carbon atom, the additive being to be incorporated into aluminum electrodeposited on the surface of the skeleton of the resinous formed body The electrolyte solution may contain other components as incidental impurities. The electrolyte solution may intentionally contain other components as long as the advantageous effects of the method for producing an aluminum porous body according to the embodiment of the present disclosure, in which the aluminum porous body having high elongation at break and having the skeleton with high hardness can be produced, are not impaired.

As the aluminum halide serving as the component (A), any aluminum halide that forms a molten salt at about 110° C. or lower when mixed with the component (B) may be appropriately used. Examples thereof include aluminum chloride ($AlCl_3$), aluminum bromide ($AlBr_3$), and aluminum iodide ($AlI_3$). Among these, aluminum chloride is most preferred.

As the alkylimidazolium halide serving as the component (B), any alkylimidazolium halide that forms a molten salt at about 110° C. or lower when mixed with the component (A) may be appropriately used.

Examples thereof include imidazolium chloride having alkyl groups (each having 1 to 5 carbon atoms) at the 1- and 3-positions, imidazolium chloride having alkyl groups (each having 1 to 5 carbon atoms) at the 1-, 2-, and 3-positions, and imidazolium iodide having alkyl groups (each having 1 to 5 carbon atoms) at the 1- and 3-positions.

Specific examples thereof include 1-ethyl-3-methylimidazolium chloride (EMIC), 1-butyl-3-methylimidazolium chloride (BMIC), and 1-methyl-3-propylimidazolium chloride (MPIC). Among these, 1-ethyl-3-methylimidazolium chloride (EMIC) can be most preferably used.

As the alkylpyridinium halide serving as the component (B), any alkylpyridinium halide that forms a molten salt at about 110° C. or lower when mixed with the component (A) may be appropriately used.

Examples thereof include 1-butylpyridinium chloride (BPC), 1-ethylpyridinium chloride (EPC), and 1-butyl-3-methylpyridinium chloride (BMPC). Among these, 1-butylpyridinium chloride is most preferred.

The urea compound serving as the component (B) refers to urea or its derivative. Any urea compound that forms a molten salt at about 110° C. or lower when mixed with the component (A) may be appropriately used.

For example, a compound represented by formula (1) may be preferably used:

[Chem. 1]

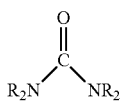

(1)

where in formula (1), each R is a hydrogen atom, an alkyl group having 1 to 6 carbon atoms, or a phenyl group, and Rs may be the same or different.

Among the urea compounds, urea or dimethylurea may be particularly preferably used.

In the electrolyte solution, when the molar mixing ratio of the component (A) to the component (B) is in the range of 1:1 to 3:1, the electrolyte solution (plating solution) is suitable for electrodeposition of aluminum on the surface of the skeleton of the resinous formed body.

If the molar ratio of the component (A) is less than 1 when the component (B) is 1, an electrodeposition reaction of aluminum does not occur. If the molar ratio of the component (A) is more than 3 when the component (B) is 1, aluminum chloride precipitates in the electrolyte solution and is incorporated into aluminum electrodeposited on the surface of the skeleton of the resinous formed body, thereby degrading the quality of aluminum.

The additive serving as the component (C) is not particularly limited as long as it contains a carbon atom and is to be incorporated into aluminum electrodeposited on the surface of the skeleton of the resinous formed body. When the additive containing a carbon atom is incorporated into aluminum, the carbon atom contained in the additive reacts with aluminum to form aluminum carbide in the resin removal step or the crystallization step described below.

The additive is preferably, for example, a compound described below.

The additive is preferably one or more selected from the group consisting of 1,10-phenanthrolinium chloride monohydrate, 1,10-phenanthroline monohydrate, 1,10-phenanthroline, 3-benzoylpyridine, pyrazine, 1,3,5-triazine, 1,2,3-benzotriazole, acetophenone, acetylpyridine, 3-pyridinecarboxaldehyde, N,N'-methylenebis(acrylamide), methyl nicotinate, nicotinoyl chloride hydrochloride, and isoniazid.

The concentration of the component (C) in the electrolyte solution may be appropriately changed in accordance with the type of the component (C) used.

For example, when 1,10-phenanthrolinium chloride monohydrate, 1,3,5-triazine, acetylpyridine, 3-pyridinecarboxaldehyde, N,N'-methylenebis(acrylamide), or nicotinoyl chloride hydrochloride is used as the component (C), the concentration of the component (C) in the electrolyte solution is preferably 0.03 g/L or more and 7.5 g/L or less. In consideration of the amount of the component (C) incorporated into the aluminum layer and the magnitude of residual stress in the aluminum layer, the concentration of the component (C) in the electrolyte solution is more preferably 0.1 g/L or more and 5.0 g/L or less, even more preferably 0.3 g/L or more and 1.5 g/L or less.

When 1,10-phenanthroline monohydrate, 3-benzoylpyridine, pyrazine, 1,2,3-benzotriazole, methyl nicotinate, or isoniazid is used as the component (C), the concentration of the component (C) in the electrolyte solution is preferably 0.05 g/L or more and 7.5 g/L or less. In consideration of the amount of the component (C) incorporated into the aluminum layer and the magnitude of residual stress in the aluminum layer, the concentration of the component (C) in the electrolyte solution is more preferably 0.1 g/L or more and 2.0 g/L or less, even more preferably 0.3 g/L or more and 1.0 g/L or less.

When 1,10-phenanthroline monohydrate and acetophenone is used as the component (C), the concentration of the component (C) in the electrolyte solution is preferably 0.1 g/L or more and 10 g/L or less. In consideration of the amount of the component (C) incorporated into the aluminum layer and the magnitude of residual stress in the aluminum layer, the concentration of the component (C) in the electrolyte solution is more preferably 0.25 g/L or more and 7 g/L or less, even more preferably 2.5 g/L or more and 5 g/L or less.

(Electrolytic Treatment Condition)

The electrolytic treatment (molten salt electrolysis) can be performed as described below.

The resinous formed body after the conductivity-imparting treatment step and aluminum are arranged opposite to each other in the electrolyte solution. The resinous formed body is connected to the cathode side of a rectifier. The aluminum is connected to the anode side. A voltage is applied between both electrodes.

Here, the molten salt electrolysis is preferably performed by controlling the current through application of the voltage in such a manner that the current density is 30 mA/cm$^2$ or more and 60 mA/cm$^2$ or less. A current density of 30 mA/cm$^2$ or more results in the formation of a smooth aluminum layer. At a current density of 60 mA/cm$^2$ or less, it is possible to inhibit the formation of scorch marks in which the aluminum layer on the surface of the skeleton of the resinous formed body turns black. From these points of view, the current density is preferably 30 mA/cm$^2$ or more and 50 mA/cm$^2$ or less, even more preferably 35 mA/cm$^2$ or more and 45 mA/cm$^2$ or less.

The current density is calculated on the basis of the apparent area of the surface of the resinous formed body on which the aluminum layer is formed.

—Resin Removal Step—

The resin removal step is a step of removing the resinous formed body from the resin structure formed in the electrolytic treatment step to provide an aluminum porous body. When the conductive layer 16 disposed on the surface of the skeleton of the resinous formed body 15 is composed of amorphous carbon or a carbon powder other than metal, the conductive layer 16 is also removed by the heat treatment. For example, in an example of a resin structure illustrated in FIG. 4, the resinous formed body 15 and the conductive layer 16 are removed by the heat treatment, leaving the aluminum layer 11. Thereby, the aluminum porous body 10 having the skeleton with the three-dimensional network structure is provided (see FIG. 1). When the conductive layer 16 of the resin structure is composed of a metal, the heat treatment of the resin structure causes the metal constituting the conductive layer 16 to diffuse into the aluminum layer 11 or to be alloyed with aluminum.

—Crystallization Step—

In the crystallization step, the aluminum porous body may be heat-treated in an atmosphere at 650° C. or higher and 680° C. or lower in a vacuum of $1.0 \times 10^{-2}$ Pa or less. The heat treatment time may be about 1 hour or more and about 60 hours or less. In the production of the aluminum porous body according to the first embodiment, the resin removal step and the crystallization step are preferably performed under same conditions.

The component (C) serving as the additive used in the electrolytic treatment step is incorporated in the aluminum layer 11 before the heat treatment of the resin structure. Because the component (C) contains a carbon atom, the heat treatment of the resin structure allows aluminum to react with the component (C) to form aluminum carbide. When the resin structure is heat-treated in an atmosphere at 650° C. or higher and 680° C. or lower in a vacuum of $1.0 \times 10^{-2}$ Pa or less, high-crystallinity aluminum carbide is formed. When the aluminum porous body having the skeleton formed of the aluminum layer 11 containing the high-crystallinity aluminum carbide is measured by an X-ray diffraction method, diffraction peaks originating from aluminum carbide are detected at two peak positions in a 2θ range of 30.8° or more and 31.5° or less and a 2θ range of 31.6° or more and 32.3° or less.

When the atmosphere in which the heat treatment is performed has a vacuum of more than $1.0 \times 10^{-2}$ Pa, high-crystallinity aluminum carbide cannot be formed in the aluminum layer 11. The atmosphere in which the heat treatment is performed preferably has a higher vacuum (lower pressure), more preferably has a vacuum of $1.0 \times 10^{-3}$ Pa or less, even more preferably $1.0 \times 10^{-4}$ Pa or less. In a vacuum of more than $1.0 \times 10^{-1}$ Pa, carbon in the coating film is partially oxidized into carbon dioxide, thus failing to form high-crystallinity aluminum carbide.

When the heat-treatment temperature of the resin structure is lower than 650° C., high-crystallinity aluminum carbide cannot be formed in the aluminum layer 11. When the heat-treatment temperature is higher than 680° C., the aluminum layer 11 constituting the skeleton melts. Thus, the heat-treatment temperature of the resin structure is more preferably 660° C. or higher and 675° C. or lower, even more preferably 665° C. or higher and 670° C. or lower.

The heat-treatment time of the resin structure is preferably 1 hour or more and 60 hours or less. When the heat-treatment time is 1 hour or more, the resinous formed body and the conductive layer can be sufficiently burned, and the reaction between aluminum and the component (C) can proceed to form aluminum carbide in the aluminum layer. When the heat-treatment time is 60 hours or less, it is possible to inhibit excessive oxidation of the aluminum layer 11. From these points of view, the heat-treatment time of the resin structure is more preferably 6 hours or more and 48 hours or less, even more preferably 12 hours or more and 36 hours or less.

[Method for Producing Aluminum Porous Body According to Second Embodiment]

A method for producing an aluminum porous body according to a second embodiment includes a conductivity-imparting treatment step, an electrolytic treatment step, a resin removal step, and a crystallization step.

The conductivity-imparting treatment step and the electrolytic treatment step in the method for producing an aluminum porous body according to the second embodiment can be performed in the same ways as the conductivity-imparting treatment step and the electrolytic treatment step in the method for producing an aluminum porous body according to the first embodiment described above; thus, descriptions are omitted.

—Resin Removal Step—

The resin removal step is a step of removing the resinous formed body from the resin structure formed in the electrolytic treatment step to provide an aluminum porous body. In the method for producing an aluminum porous body according to the second embodiment, a method for removing the resinous formed body is not particularly limited. Examples thereof include heat treatment and removal by dissolution with an acid or an alkali. The heat treatment may be performed in an air atmosphere at 400° C. or higher, unlike the heat treatment in high vacuum at a high temperature for the method for producing an aluminum porous body according to the first embodiment. The heat-treatment time here is preferably within 1 hour, more preferably within 30 minutes.

Regarding the acid or the alkali, for example, the removal may be performed by immersing the resin structure in hydrochloric acid (HCl), sulfuric acid ($H_2SO_4$), sodium hydroxide (NaOH), dilute nitric acid ($HNO_3$), concentrated nitric acid, or the like.

—Crystallization Step—

The crystallization step may be performed under the same conditions as those in the resin removal step in the method for producing an aluminum porous body according to the first embodiment. That is, the aluminum porous body may be heat-treated in an atmosphere at 650° C. or higher and 680° C. or lower in a vacuum of $1.0 \times 10^{-2}$ Pa or less. The heat-treatment time may be about 1 hour or more and 60 hours or less.

The component (C) serving as the additive used in the electrolytic treatment step is contained in the aluminum layer of the aluminum porous body after the resin removal step. In the case where the resin removal step is performed by heat treatment in air or a molten salt, aluminum carbide formed by reaction of aluminum with a carbon atom originating from the component (C) is contained in the aluminum layer. However, the aluminum carbide has low crystallinity. Thus, when the aluminum porous body is measured by an X-ray diffraction method, only one diffraction peak originating from aluminum carbide can be detected.

In the method for producing an aluminum porous body according to the second embodiment, the crystallization step is performed after the resin removal step, thereby enabling the crystallinity of aluminum carbide in the aluminum layer to be increased. In the case where the component (C) unreacted with aluminum is contained in the aluminum layer of the aluminum porous body after the resin removal step, by performing the crystallization step, aluminum and the component (C) can be reacted to form high-crystallinity aluminum carbide in the aluminum layer.

EXAMPLES

While the present disclosure will be described in more detail below by examples, these examples are illustrative, an aluminum porous body and a production method therefor of the present disclosure are not limited thereto. The scope of the present disclosure is defined by the following claims, and is intended to include any modifications within the scope and meaning equivalent to the scope of the claims.

Example 1

<Conductivity-Imparting Treatment Step>

A polyurethane sheet having a thickness of 1.5 mm was used as a resinous formed body having a skeleton with a three-dimensional network structure. The resinous formed body had a porosity of 96% and an average pore diameter of 450 μm.

A conductivity-imparting treatment was performed by immersing the polyurethane sheet in a carbon suspension and drying the polyurethane sheet to form a conductive layer on the surface of the skeleton of the polyurethane sheet. Regarding components of the carbon suspension, the suspension contained 25% graphite and carbon black and contained a resin binder, a penetrant, and an antifoaming agent. The carbon black had a particle size of 0.5 μm.

<Electrolytic Treatment Step>
(Electrolyte Solution)

Aluminum chloride ($AlCl_3$) was used as component (A), and 1-ethyl-3-methylimidazolium chloride (EMIC) was used as component (B). The component (A) and the component (B) were mixed in a molar ratio of 2:1 to prepare a molten salt. Then 1,10-phenanthrolinium chloride monohydrate was added as component (C) to the molten salt in a concentration of 0.5 g/L, thereby providing an electrolyte solution.

(Molten Salt Electrolysis)

Molten salt electrolysis was performed in the electrolyte solution provided above in such a manner that the polyurethane sheet that had been subjected to the conductivity-imparting treatment was used as a cathode and an aluminum plate having a purity of 99.99% was used as an anode. Thereby, aluminum was electrodeposited on the surface of the skeleton of the polyurethane sheet to provide a resin structure. The temperature of the electrolyte solution was 45° C. The current density was 6.0 A/dm².

<Resin Removal Step and Crystallization Step>

The resin structure provided above was heat-treated at 660° C. for 24 hours in a vacuum of $1.0 \times 10^{-2}$ Pa to remove the polyurethane sheet and a conductive layer from the resin structure, thereby providing aluminum porous body No. 1.

Example 2

Aluminum porous body No. 2 was produced as in Example 1, except that the heat-treatment temperature of the resin removal step and the crystallization step was 665° C.

Example 3

Aluminum porous body No. 3 was produced as in Example 1, except that the heat-treatment temperature of the resin removal step and the crystallization step was 670° C.

Example 4

Aluminum porous body No. 4 was produced as in Example 1, except that the pressure of the atmosphere in the resin removal step and the crystallization step was $4.0 \times 10^{-3}$ Pa.

Example 5

<Conductivity-Imparting Treatment Step>

A resinous formed body identical to the resinous formed body used in Example 1 was provided. A conductivity-imparting treatment step was performed as in Example 1.

<Electrolytic Treatment Step>

An electrolytic treatment step was performed as in Example 1 to provide a resin structure.

<Resin Removal Step>

The resin structure provided above was heat-treated at 500° C. for 20 minutes in air to remove a polyurethane sheet and a conductive layer from the resin structure, thereby providing an aluminum porous body.

<Crystallization Step>

The aluminum porous body provided above was heat-treated at 660° C. for 24 hours in a vacuum of $1.0 \times 10^{-2}$ Pa to provide aluminum porous body No. 5.

Example 6

<Conductivity-Imparting Treatment Step>

A resinous formed body identical to the resinous formed body used in Example 1 was provided. A conductivity-imparting treatment step was performed as in Example 1.

<Electrolytic Treatment Step>

An electrolytic treatment step was performed as in Example 1 to provide a resin structure.

<Resin Removal Step>

The resin structure provided above was immersed in 69% by mass concentrated nitric acid at 25° C. for 10 minutes to remove a polyurethane sheet and a conductive layer from the resin structure, thereby providing an aluminum porous body.

<Crystallization Step>

The aluminum porous body provided above was heat-treated at 660° C. for 24 hours in a vacuum of $1.0 \times 10^{-2}$ Pa to provide aluminum porous body No. 6.

Comparative Example 1

Aluminum porous body No. 7 was produced as in Example 1, except that the heat treatment in each of the resin removal step and the crystallization step was performed at atmospheric pressure ($1.0 \times 10^5$ Pa).

Comparative Example 2

Aluminum porous body No. 8 was produced as in Example 1, except that the heat-treatment temperature in each of the resin removal step and the crystallization step was 600° C.

Comparative Example 3

Aluminum porous body No. 9 was produced as in Example 1, except that the pressure in each of the resin removal step and the crystallization step was $7.0 \times 10^{-2}$ Pa.

—Evaluation—

Aluminum porous body Nos. 1 to 9 provided above were evaluated as described below.

Table 1 presents the evaluation results.

<X-Ray Diffraction>

Figure 5:
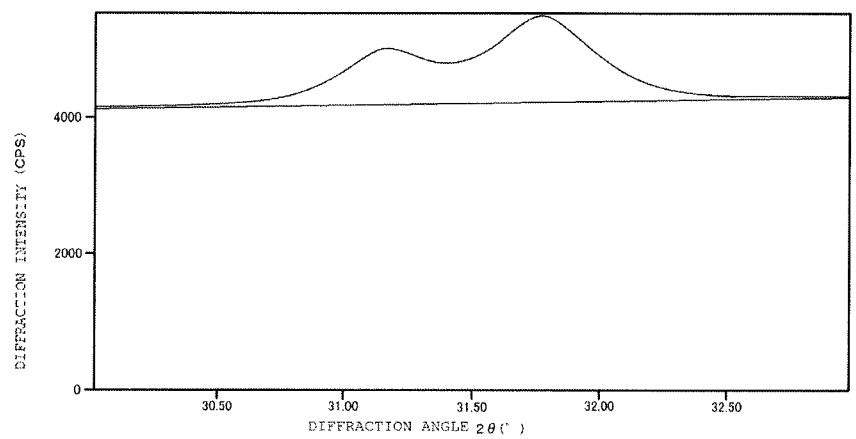
FIG. 5 is a spectrum illustrating the results of X-ray diffraction measurement of aluminum porous body No. 2 produced in an example.
Figure 6:
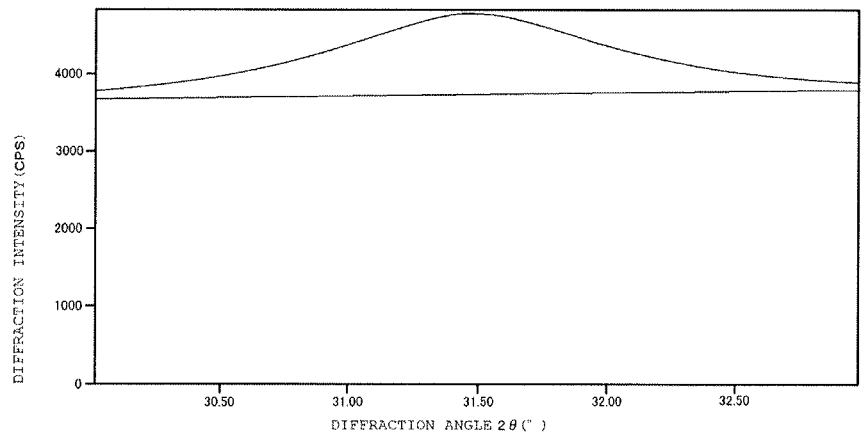
FIG. 6 is a spectrum illustrating the results of X-ray diffraction measurement of aluminum porous body No. 8 produced in a comparative example.

Aluminum carbide in each of the aluminum porous bodies was detected with a SmartLab X-ray diffractometer available from Rigaku Corporation. Cu-Kα is used as an X-ray source. The excitation conditions of 45 kV and 40 mA were used. The measurement range was 2θ=30° to 33°. The step size was 0.04°. The counting time was 40 seconds. FIGS. 5 and 6 illustrate the measurement results of aluminum porous body Nos. 2 and 8, respectively. In FIGS. 5 and 6, the vertical axis represents the diffraction intensity (counts per second: CPS), and the horizontal axis represents the diffraction angle 2θ(°).

Aluminum in each of aluminum porous body Nos. 1 to 9 was detected in a measurement range of 2θ=37° to 40° at a step size of 0.04° and a counting time of 5 seconds.

<Aluminum Carbide Content>

The amount of aluminum carbide contained in each of the aluminum porous bodies was calculated from the ratio of the intensity of a peak originating from aluminum carbide to the intensity of a peak originating from aluminum on the basis of the measurement results of XRD.

<Tensile Strength>

Autograph available from Shimadzu Corporation was used as a tensile tester. A test piece having a width of 20 mm and a length of 100 mm was cut from each aluminum porous body. A tensile test was performed at a gauge length (length excluding tabs for gripping) of 60 mm when both ends are fixed by grips. The strain rate was 1 mm/min. Here, the tensile strength referred to the maximum stress in the tensile test.

<Elongation at Break>

The term "elongation at break" used here referred to the percentage of the length L at which the maximum stress was observed relative to the gauge length in the tensile test above.

<Hardness H>

The hardness was measured with a nanoindenter.

<Number-Average Grain Size of Grains of Aluminum Layer>

The number-average grain size of the grains of the aluminum layer was calculated by freely selecting 10 grains observed when a cross section of the skeleton of the aluminum porous body was observed with an electron microscope (SEM) and averaging their grain sizes. When the number of grains observed in one field of view is less than 10, observation was continued in a different field of view to measure the grain size of a total of 10 grains.

Figure 7:
FIG. 7 is a photograph of a cross-section of the skeleton of aluminum porous body No. 2, which is produced in an example, observed with an electron microscope (SEM).

FIG. 7 is a photograph of a cross-section of the skeleton of aluminum porous body No. 2 observed with SEM. Portions enclosed by broken lines in FIG. 7 indicate grains of the aluminum layer.

TABLE 1

| Aluminum porous body No. | Heat-treatment condition in crystallization step | | Peak position 2Θ of aluminum carbide in XRD (°) | | Evaluation | | | | |
|---|---|---|---|---|---|---|---|---|---|
| | Pressure (Pa) | Temperature (° C.) | | | Aluminum carbide content (% by mass) | Tensile strength (MPa) | Elongation at break (%) | Hardness (GPa) | Number-average grain size of grain of aluminum layer (μm) |
| 1 | $1.0 \times 10^{-2}$ | 660 | 31.2 | 31.7 | 0.96 | 0.91 | 1.8 | 1.5 | 6.9 |
| 2 | $1.0 \times 10^{-2}$ | 665 | 31.3 | 31.8 | 0.97 | 1.02 | 1.9 | 1.2 | 6.8 |
| 3 | $1.0 \times 10^{-2}$ | 670 | 31.3 | 31.7 | 0.82 | 0.88 | 2.1 | 1.6 | 7.2 |
| 4 | $4.0 \times 10^{-3}$ | 660 | 31.2 | 31.7 | 1.01 | 0.98 | 2.0 | 1.5 | 6.9 |
| 5 | $1.0 \times 10^{-2}$ | 660 | 31.2 | 31.7 | 0.92 | 0.95 | 2.0 | 1.5 | 7.1 |
| 6 | $1.0 \times 10^{-2}$ | 660 | 31.2 | 31.8 | 0.99 | 0.92 | 1.9 | 1.6 | 6.9 |
| 7 | $1.0 \times 10^{5}$ | 660 | — | | — | — | — | — | — |
| 8 | $1.0 \times 10^{-2}$ | 600 | 31.5 | | 0.94 | 0.51 | 1.1 | 0.4 | 1.8 |
| 9 | $7.0 \times 10^{-2}$ | 660 | 31.4 | | 0.81 | 0.86 | 0.9 | 1.1 | 1.5 |

Because each of aluminum porous body Nos. 1 to 6 contained high-crystallinity aluminum carbide in the skeleton, peaks originating from aluminum carbide were detected at two peak positions in a 2θ range of 30.8° or more and 31.5° or less and a 2θ range of 31.6° or more and 32.3° or less in the XRD measurement. Additionally, each of aluminum porous body Nos. 1 to 6 had good results in terms of tensile strength, elongation at break, and hardness H (see Table 1).

In contrast, in aluminum porous body No. 7 produced by a conventional production method, no peaks originating from aluminum carbide were detected in the XRD measurement. It was impossible to measure elongation at break thereof.

In each of aluminum porous body No. 8 in which the temperature was reduced in the resin removal step and aluminum porous body No. 9 in which the pressure of the atmosphere was increased, only one peak originating from aluminum carbide was detected in the XRD measurement. Both had lower elongation at break than aluminum porous body Nos. 1 to 6.

REFERENCE SIGNS LIST

10 aluminum porous body
11 aluminum layer
12 skeleton
13 interior of skeleton
14 porous portion
15 resinous formed body
16 conductive layer

The invention claimed is:

1. An aluminum porous body, comprising a skeleton with a three-dimensional network structure,
    wherein the skeleton is formed of an aluminum layer containing aluminum carbide, and
    when the aluminum porous body is measured by an X-ray diffraction method, diffraction peaks originating from the aluminum carbide are detected at two peak positions in a 2θ range of 30.8° or more and 31.5° or less and a 2θ range of 31.6° or more and 32.3° or less, and wherein there is a valley portion between the diffraction peaks detected at the two peak positions, and a diffraction intensity of the diffraction peak detected at the peak position in the 2θ range of 31.6° or more and 32.3° or less is higher than a diffraction intensity of the diffraction peak detected at the peak position in the 2θ range of 30.8° or more and 31.5° or less.

2. The aluminum porous body according to claim 1, wherein the skeleton has an aluminum carbide content of 0.5% or more by mass and 1.8% or less by mass.

3. The aluminum porous body according to claim 1, wherein the aluminum porous body has a tensile strength of 0.8 MPa or more.

4. The aluminum porous body according to claim 1, wherein the aluminum porous body has an elongation at break of 1.6% or more.

5. The aluminum porous body according to claim 1, wherein the skeleton of the aluminum porous body has a hardness H of 0.5 GPa or more and 2.0 GPa or less, the hardness being measured with a nanoindenter.

6. The aluminum porous body according to claim 1, wherein grains in the aluminum layer constituting the skeleton have a number-average grain size of 2.0 μm or more and 10.0 μm or less.

7. A method for producing the aluminum porous body according to claim 1, the method comprising:
a conductivity-imparting treatment step of subjecting a surface of a skeleton of a resinous formed body to conductivity-imparting treatment to impart conductivity, the skeleton having a three-dimensional network structure;
an electrolytic treatment step of subjecting the resinous formed body after the conductivity-imparting treatment step to electrolytic treatment in an electrolyte solution to provide a resin structure through electrodeposition of aluminum on the surface of the skeleton;
a resin removal step of removing the resinous formed body to provide an aluminum porous body through removal of the resin structure by heat-treating the resin structure or by dissolving the resin structure with an acid or an alkali; and
a crystallization step,
wherein the electrolyte solution used in the electrolytic treatment step contains, as components:
(A) an aluminum halide;
(B) one or more compounds selected from the group consisting of alkylimidazolium halides, alkylpyridinium halides, and urea compounds; and
(C) an additive containing a carbon atom, the additive being to be incorporated into aluminum electrodeposited on the surface of the skeleton of the resinous formed body,
wherein a molar mixing ratio of the component (A) to the component (B) is in a range of 1:1 to 3:1, and
each of the resin-removing step and the crystallization step is performed by heat-treating the resin structure in an atmosphere at 650° C. or higher and 680° C. or lower in a vacuum of $1.0 \times 10^{-2}$ Pa or less.

8. A method for producing the aluminum porous body according to claim 1, the method comprising:
a conductivity-imparting treatment step of subjecting a surface of a skeleton of a resinous formed body to conductivity-imparting treatment to impart conductivity, the skeleton having a three-dimensional network structure;
an electrolytic treatment step of subjecting the resinous formed body after the conductivity-imparting treatment step to electrolytic treatment in an electrolyte solution to provide a resin structure through electrodeposition of aluminum on the surface of the skeleton;
a resin removal step of removing the resinous formed body to provide an aluminum porous body by removing the resin structure by heat-treating the resin structure or by dissolving the resin structure with an acid or an alkali; and
a crystallization step,
wherein the electrolyte solution used in the electrolytic treatment step contains, as components:
(A) an aluminum halide;
(B) one or more compounds selected from the group consisting of alkylimidazolium halides, alkylpyridinium halides, and urea compounds; and
(C) an additive containing a carbon atom, the additive being to be incorporated into aluminum electrodeposited on the surface of the skeleton of the resinous formed body,
wherein a molar mixing ratio of the component (A) to the component (B) is in a range of 1:1 to 3:1,
the resin removal step is performed by dissolution and removal, and
the crystallization step is performed by heat-treating the resin structure in an atmosphere at 650° C. or higher and 680° C. or lower in a vacuum of $1.0 \times 10^{-2}$ Pa or less.

9. A method for producing the aluminum porous body according to claim 1, the method comprising:
a conductivity-imparting treatment step of subjecting a surface of a skeleton of a resinous formed body to conductivity-imparting treatment to impart conductivity, the skeleton having a three-dimensional network structure;
an electrolytic treatment step of subjecting the resinous formed body after the conductivity-imparting treatment step to electrolytic treatment in an electrolyte solution to provide a resin structure through electrodeposition of aluminum on the surface of the skeleton;
a resin removal step of removing the resinous formed body to provide an aluminum porous body through removal of the resin structure by heat-treating the resin structure or by dissolving the resin structure with an acid or an alkali; and
a crystallization step,
wherein the electrolyte solution used in the electrolytic treatment step contains, as components:
(A) an aluminum halide;
(B) one or more compounds selected from the group consisting of alkylimidazolium halides, alkylpyridinium halides, and urea compounds; and
(C) an additive containing a carbon atom, the additive being to be incorporated into aluminum electrodeposited on the surface of the skeleton of the resinous formed body,
wherein a molar mixing ratio of the component (A) to the component (B) is in a range of 1:1 to 3:1,
the resin removal step is performed by heat-treating the resin structure at 400° C. or higher in an air atmosphere, and
the crystallization step is performed by heat-treating the resin structure in an atmosphere at 650° C. or higher and 680° C. or lower in a vacuum of $1.0 \times 10^{-2}$ Pa or less.

* * * * *